United States Patent [19]
Fishman

[11] 3,835,325
[45] Sept. 10, 1974

[54] RADIATION DETECTORS USING MULTIPLE SCINTILLATION CRYSTAL PIECES

[75] Inventor: Gerald J. Fishman, Huntsville, Ala.

[73] Assignee: Brown Engineering Company, Inc., Huntsville, Ala.

[22] Filed: Aug. 18, 1972

[21] Appl. No.: 281,699

[52] U.S. Cl................................. 250/366, 250/367
[51] Int. Cl.............................................. G01t 1/20
[58] Field of Search............ 250/71.5 R, 71.5 S, 366, 250/367, 368

[56] References Cited
UNITED STATES PATENTS

| | | | |
|---|---|---|---|
| 2,768,308 | 10/1956 | Schultz | 250/71.5 R |
| 2,828,423 | 3/1958 | Scherbatskoy | 250/71.5 R |
| 3,233,102 | 2/1966 | Packard | 250/71.5 S |
| 3,376,417 | 4/1968 | Keck et al. | 250/71.5 S |

Primary Examiner—Archie R. Borchelt
Attorney, Agent, or Firm—Browne, Beveridge, DeGrande & Kline

[57] ABSTRACT

An apparatus for the detection of invisible radiation utilizing a unique geometry which results in an improved efficiency. A plurality of inorganic halide crystals are contained in a region of an enclosure, upon one surface of which is disposed a plurality of photomultiplier tubes. An optical coupling medium is diposed between a boundary of the crystals and the photomultiplier tubes, the medium being of a certain minimum dimension to ensure that light emitted from the crystals is incident at the photomultiplier tubes. In one embodiment, the enclosure is cylindrical and a sample area is centrally located within the enclosure. In another embodiment the enclosure is a parallelepiped with a large sample area located below the enclosure and the photomultiplier tubes located on the upper surface of the enclosure.

22 Claims, 4 Drawing Figures

3,835,325

PATENTED SEP 10 1974

RADIATION DETECTORS USING MULTIPLE SCINTILLATION CRYSTAL PIECES

BACKGROUND OF THE INVENTION

This invention relates to detectors for invisible radiation and more particularly to detectors having a means therein for coupling invisible radiation to visible radiation which is then detected by conventional photodetecting means such as photo-multiplier tubes.

Detectors for invisible radiation are generally known in the prior art and are useful in numerous applications in industry and medicine. For instance, invisible radiation detectors have been used to identify radioactive materials by recognizing the characteristic radiation emitted therefrom and to determine the total radiation emanating from the body of a person or animal for diagnostic and/or research purposes. One of the problems associated with radiation detectors of the prior art, however, and especially large volume detectors wherein a plurality of visible radiation detection means must be used, has been their relative inefficiency in converting invisible radiation to a detectable form without going to considerable effort and expense in construction and maintenance. Additionally, many large volume radiation detectors of the prior art have utilized either organic scintillation materials which typically have low photopeak efficiency and poor energy resolution, or single crystal scintillators or single crystal array scintillators which are difficult to manufacture and consequently very expensive.

The present invention overcomes the above mentioned problems of prior art radiation detectors by providing a large volume apparatus for the detection of invisible radiation which employs a unique geometrical configuration resulting in improved efficiency. Additionally, the apparatus of the present invention attains increased efficiency and low cost by using a plurality of uncut, unpolished inorganic scintillation crystals to convert invisible radiation to visible radiation.

Accordingly, it is a primary object of this invention to provide a novel apparatus for detecting invisible radiation having improved efficiency.

It is a further object of this invention to provide an apparatus for the detection of invisible radiation which utilizes a unique geometrical configuration.

It is yet a further object of this invention to provide an apparatus for the detection of invisible radiation wherein substantially all of the invisible radiation emitted by a sample is converted to visible radiation.

Another object of the invention is to provide a large volume invisible radiation detector which eliminates the use of organic scintillators, single crystal scintillators and single crystal scintillator arrays.

The above objects are accomplished by providing an apparatus containing a material having the property of converting invisible radiation to visible radiation which has an outer boundry across which visible radiation is transmitted. A plurality of means for detecting the emitted visible radiation are located substantially parallel to the boundry, separated from the boundry by an optical coupling medium. The medium is of at least a certain minimum thickness so that a substantial quantity of the visible radiation transmitted across the boundry is incident on the light detecting means.

Further details of this invention will be clear from the following description and appended claims taken in conjunction with the accompanying drawings in which are illustrated preferred embodiments of the invention.

DETAILED DESCRIPTION OF THE INVENTION

A scintillation detector is used by itself or in conjunction with other detectors to identify and measure gamma rays or other radiation from radioactive materials. In practice, a gamma ray entering the scintillation detector will deposit all or part of its energy within the detector. This energy is then converted into optical photons by the scintillation material. The optical photons are detected by photomultiplier tubes and converted therein to an electronic pulse. The amplitude of the resulting pulse, which is analyzed by subsequent electronics, is proportional to the gamma ray or other radiation energy deposited within the scintillation detector. If all of the gamma ray radiation is deposited within the active volume of the detector, the resulting voltage amplitude is referred to as the "photo peak." By calibrating the detector with known radioactive sources, the gamma ray corresponding to the observed photo peak may then be determined and the radioactive species emitting the characteristic gamma ray may be identified. The amount of radioactive material is determined by the number of counts in the photo peak within a certain accumulation time and by comparison with known sources.

For many applications, it is desirable to use a large volume radiation detector to achieve a high photo peak efficiency and to detect radiation from a large source, or to completely surround another detector. "Large volume" is intended to indicate that a typical dimension of the detector is greater than the diameter of the most widely used photomultiplier tubes, so that a plurality of tubes must be used.

The geometry of the detector varies for different experimental arrangements. However, a very efficient geometry is obtained by having the detector surround the source. In certain applications, a second detector is placed within the scintillation detector along with the sample under study. Accurate timing and energy information from the two detectors is then used to accept only the radiation of interest and to reject unwanted counts. This is known as the "coincidence" or "anticoincidence technique" and is well-known in the field of radiation detection.

Figure 1:
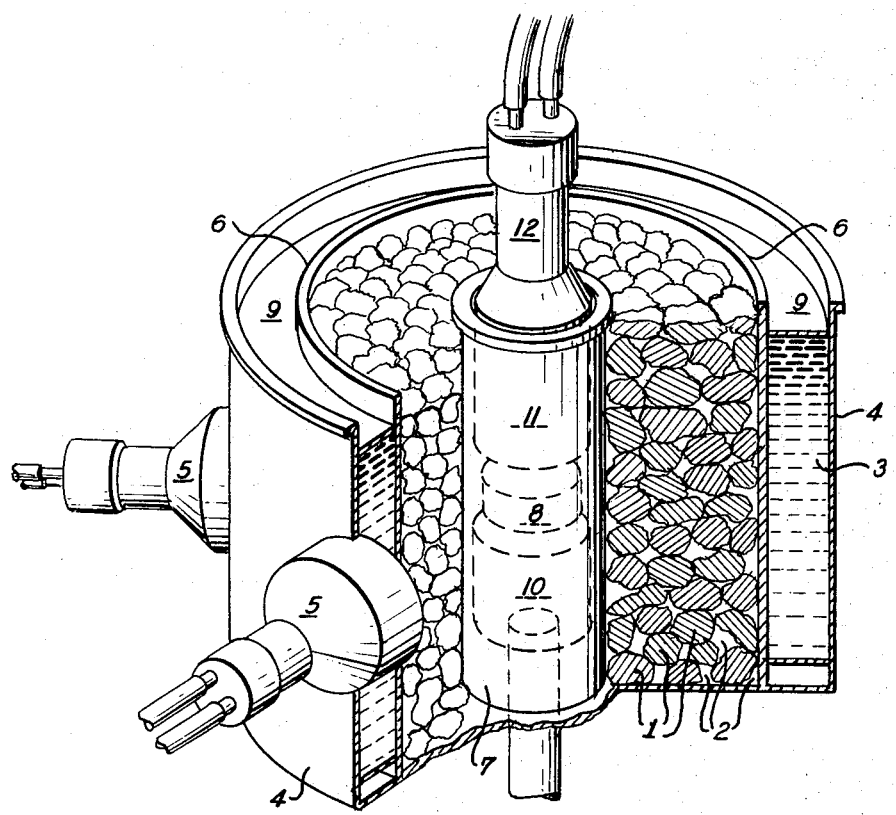
FIG. 1 is a schematic illustration of one preferred embodiment of the invention.
Figure 2:
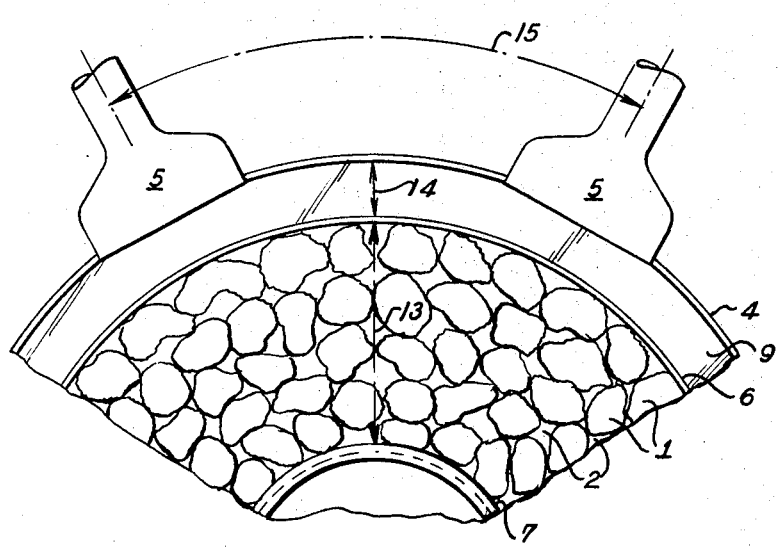
FIG. 2 is a partial top view of a portion of FIG. 1, showing the relation between the scintillation crystal pieces, the optical coupling medium, and the light-detection devices.

Referring now to FIG. 1 and FIG. 2, a plurality of uncut and unpolished crystal pieces 1 are immerged within an optical coupling medium 2. A further optical coupling medium 3 is disposed about the crystal pieces 1 to form an optical coupling region connecting light emitted from crystal pieces 1 to light-detection devices 5. Light-detection devices 5, preferably photomultiplier tubes, are spaced about the periphery of container 4 to uniformly view light emitted from crystal pieces 1.

A sample holding area 7 is provided in the center of the device, so that a radiation-emitting sample 8 can be admitted for radiation detection. To contain crystal pieces 1 about sample area 7, a transparent support 6 surrounds crystal pieces 1 separating them from optical coupling medium 3. Further supports 9 hold support 6 in proper posture, and contain optical coupling medium 3.

The optical coupling medium 2, 3 functions to transport the light from the crystal pieces 1 to the radiation-detection devices 5, and also to protect the crystal surfaces from hydration. It can be of any solid or liquid material which is chemically stable and highly transparent to scintillation light. Although desirable, it is not necessary that the index of refraction of the optical coupling material 2, 3 match that of the crystal pieces 1. This is due to the fact that a mismatch would cause total internal reflection of the crystal and frustrate the transport of light to the light detection devices 5. However, this frustration would, in general, not cause additional absorption or removal of light from the detector system, since the light could reach the light-detection devices 5 via another path. In most detectors, it will be advantageous to use a hydrocarbon such as mineral oil because of its low effective atomic number. This assures that only a few per cent of the total radiation will be stopped by the optical coupling medium 2, 3 rather than by the crystal pieces 1.

Large light losses and thus poor energy resolution occur when the scintillation light traverses scores of crystal surfaces in order to reach light detection devices 5. To avoid these losses, crystal pieces 1 should have at least one dimension being at least one inch in length, so that in a large volume detector any emitted light passes through fewer than twenty crystal surfaces, on the average, before reaching light detection devices 5.

Preferably, crystal pieces 1 are packed in the detector container by hand in order to achieve a high packing ratio of scintillation crystals to optical coupling medium 2. By judiciously choosing the proper crystals according to size and shape, one can achieve a crystal packing fraction, that of total crystal volume to the total volume in which the crystals are contained, of over 70 percent. This compares with a packing fraction of only about 50 percent if the crystals are packed at random.

FIG. 1 shows an embodiment of the invention forming a multi-crystal spectrometer annulus for detecting low levels of radiation from environmental samples collected in the vicinity of nuclear power plants. For this application, a high efficiency lithium-drifted germanium detector 10 is the primary detector, and the multi-crystal spectrometer annulus is used in anticoincidence to reduce the background and Compton-scattering radiation from the lithium-drifted germanium detector 10. The sample 8 under study and the lithium-drifted germanium detector are both placed in the sample area 7. A second detector consisting of integral plug 11 and light-detection device 12 is placed inside of the detection apparatus. Accurate timing and energy information from the two detectors is then used to accept only the radiation of interest and to reject unwanted counts.

For maximum energy resolution and, therefore, higher efficiency, it is important that a clear space of optical coupling medium 3 be placed between the light-detection devices 5 and the crystal pieces 1. This clear space is referred to as a "light guide". The depth of optical coupling medium 3 and the spacing of successive light-detection devices 5 are in direct relation with the region containing crystals 1 to provide maximum and uniform viewing of the crystal pieces 1 and scintillation events. The total crystal thickness 13 depends on the particular application of the apparatus. For radiation in the gamma ray region, above one MeV, it should be from one to two mean-free-paths thick, or about six inches. Thickness 14 of the optical coupling material 3 should be at least one-third of the thickness 13 of the region containing crystals 1. Additionally, the spacing 15 between adjacent light-detection devices 5 should be no greater than twice the thickness 13 of the region containing cyrstal pieces 1.

Figure 3:
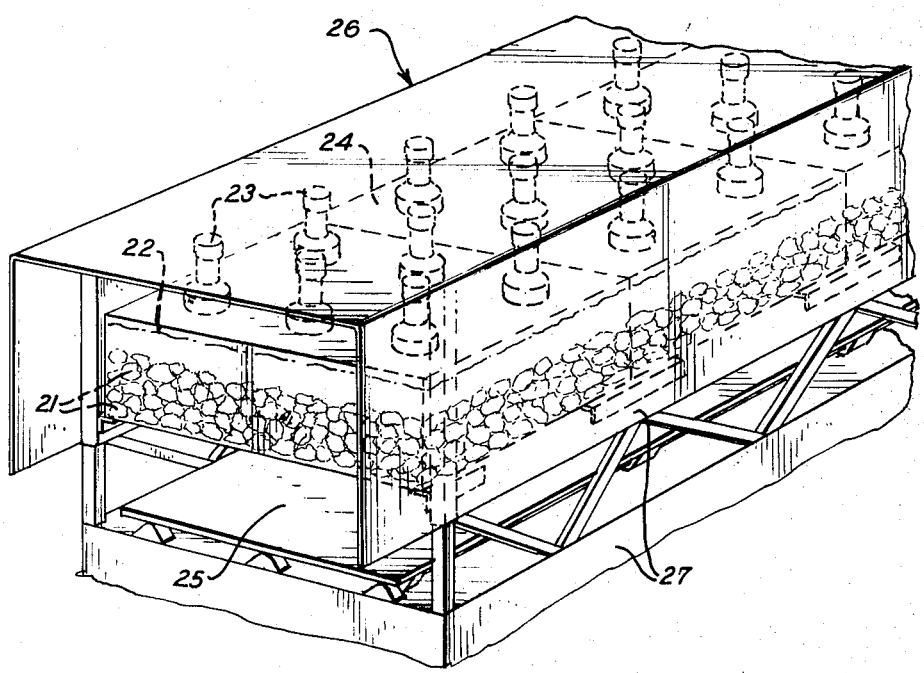
FIG. 3 is a schematic illustration of a second embodiment of the invention.
Figure 4:
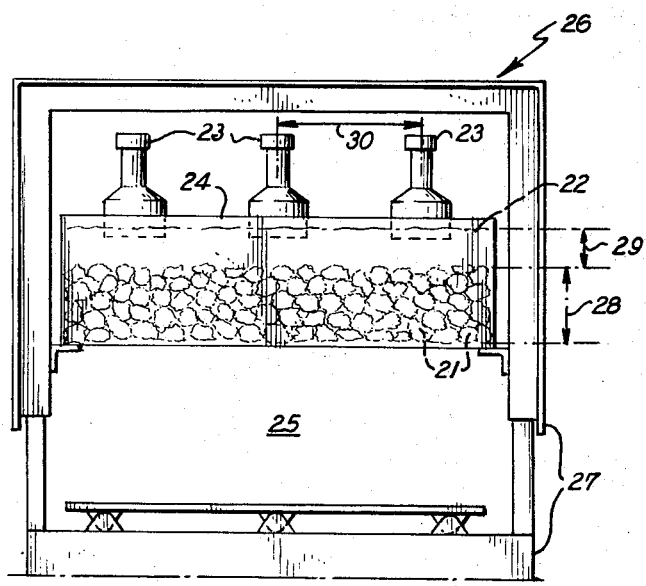
FIG. 4 is an end view of the apparatus of FIG. 3, showing the relationships of elements contained therein.

Referring now to a second preferred embodiment in FIG. 3 and FIG. 4, a plurality of crystal pieces 21 are immerged within an optical coupling medium 22 which extends above crystal pieces 21 to a plurality of light-detection devices 23. Light-detection devices 23 are spaced on opaque surface 24 for maximum and even viewing of light photons emitted from crystal pieces 21. A sample area 25 is located beneath crystal pieces 21 and is large enough to admit a human being or animal. Detector 26 is of sufficient size so that sample area 25 will entirely contain any introduced sample beneath crystal pieces 21. To protect detector 26 from receiving any spurious radiation, it is encased within radiation-shielding material 27.

For maximum energy resolution and, therefore, higher efficiency, as in the embodiment of FIGS. 1 and 2 it is important that a clear space of optical coupling medium 22 be placed between the light-detection devices 23 and the crystal pieces 21. The thickness 29 of the light-guide region should be at least one-third of the thickness 28 of the region containing crystal pieces 21. Additionally, the spacing 30 between adjacent light-detection devices 23 should be no greater than twice the thickness 28 of the region containing crystal pieces 21.

In view of the foregoing, it should be appreciated that the new concept in the structure of radiation detectors as embodied in the present invention has substantially eliminated persisting problems in the art by providing an apparatus which has higher efficiency due to its greater energy resolution and novel geometry, and flexibility in size and shape due to employment of multiple pieces of scintillator crystal.

It should be obvious to one skilled in the art that the invention may be embodied in other specific forms without departing from the spirit or essential characteristics thereof. For example, the detector could be made with a circular or oval cross-section, so that a larger sample under study would be completely surrounded by the detector. The present embodiment is, therefore, to be considered in all respects as illustrative and not restrictive. The scope of the invention is indicated by the appended claims rather than the foregoing description, and all changes which come within the meaning and intent of the claims will, therefore, not depart from the true spirit and scope of the invention.

What is claimed as new and is desired to be secured by a United States Letters Patent is:

1. An apparatus for the detection of invisible radiation comprising a substantially closed enclosure containing a material having the property of converting invisible radiation to visible radiation, said material being of substantially constant thickness and having a boundary, across which said visible radiation is transmitted, a plurality of means for detecting said visible radiation located substantially parallel to said boundary, an optical coupling medium being disposed between said means for detecting and said boundary, and said boundary being situated at least a certain minimum distance from said means for detecting whereby a substantial quantity of the visible radiation transmitted across said boundary is incident on said means for detecting.

2. The apparatus of claim 1 wherein the thickness of said optical coupling medium is at least one-third of the thickness of said material.

3. The apparatus of claim 1 wherein the spacing between adjacent means for detecting is no greater than twice the thickness of said material.

4. The apparatus of claim 1 wherein said material comprises a plurality of crystals immerged within an optical coupling medium.

5. The apparatus of claim 4 wherein said crystals are transparent to said visible radiation and have at least one dimension which is at least one inch in length.

6. The apparatus of claim 1 wherein said plurality of means for detecting are located on a surface which is part of said enclosure.

7. The apparatus of claim 6 wherein said surface comprises an outside wall of said enclosure.

8. The apparatus of claim 4 wherein said crystals are inorganic alkali halide crystals in an uncut and unpolished form, and said crystals are packed within said enclosure to achieve a crystal packing fraction of at least 0.7.

9. The apparatus of claim 7 wherein said surface is a plane surface.

10. The apparatus of claim 9 wherein said enclosure is substantially a rectangular parallelepiped.

11. The apparatus of claim 10 wherein a sample accommodating area is located parallel to and spaced from said parallelepiped, said area having at least one dimension which corresponds to a dimension of said parallelepiped.

12. The apparatus of claim 11 wherein said sample accommodating area is dimensioned to accommodate a human being or an animal.

13. The apparatus of claim 7 wherein said surface is a curved surface.

14. The apparatus of claim 13 wherein a light transparent support is disposed within said enclosure to form said boundary.

15. The apparatus of claim 14 wherein said transparent support is a cylindrical support for containing said material, said optical coupling medium being disposed between said support and said outside wall.

16. The apparatus of claim 7 wherein said apparatus further includes a sample accommodating area for accommodating an invisible radiation-emitting sample, said area being surrounded by said material.

17. The apparatus of claim 7 wherein said outside wall is cylindrical.

18. An apparatus for the detection of invisible radiation comprising an opaque enclosure having a plurality of visible radiation detection means disposed thereat, an area centrally located within said enclosure for accommodating an invisible radiation-emitting sample, means surrounding said area for converting invisible radiation to visible radiation, whereby substantially all of the invisible radiation emitted by a sample located in said area is converted to visible radiation, said means for converting being of substantially constant thickness, and an optical coupling medium for transmitting said visible radiation to said detection means being located between said detection means and said means for converting.

19. The apparatus of claim 18 wherein the thickness of said optical coupling medium is at least one-third of said means for converting.

20. The apparatus of claim 18 wherein the spacing between adjacent visible radiation detection means is no greater than twice the thickness of said means for converting.

21. The apparatus of claim 18 wherein said means for converting comprises a plurality of crystals immerged within an optical coupling medium.

22. The apparatus of claim 21 wherein said crystals are transparent to said visible radiation, are in uncut and unpolished form and have at least one dimension which is at least one inch in length.

* * * * *